United States Patent
Takahashi

(10) Patent No.: US 9,190,877 B2
(45) Date of Patent: Nov. 17, 2015

(54) ROTOR FOR ROTATING ELECTRIC MACHINE

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 285 days.

(21) Appl. No.: 14/025,979

(22) Filed: Sep. 13, 2013

(65) Prior Publication Data
US 2014/0077653 A1 Mar. 20, 2014

(30) Foreign Application Priority Data
Sep. 14, 2012 (JP) ................. 2012-203242

(51) Int. Cl.
*H02K 21/12* (2006.01)
*H02K 1/27* (2006.01)

(52) U.S. Cl.
CPC .............. *H02K 1/274* (2013.01); *H02K 1/2766* (2013.01); *H02K 2213/03* (2013.01)

(58) Field of Classification Search
CPC .. H02K 1/274; H02K 1/2766; H02K 2213/03
USPC ............................ 310/156.55, 156.56, 156.57
See application file for complete search history.

(56) References Cited

U.S. PATENT DOCUMENTS

| 7,851,958 | B2 * | 12/2010 | Cai et al. ................... | 310/156.53 |
| 2009/0026867 | A1 * | 1/2009 | Haruno et al. ............ | 310/156.21 |
| 2009/0079287 | A1 | 3/2009 | Hattori et al. | |
| 2011/0241468 | A1 | 10/2011 | Inagaki et al. | |
| 2013/0099617 | A1 * | 4/2013 | Chamberlin ............. | 310/156.21 |

FOREIGN PATENT DOCUMENTS

| JP | 2000-278896 | 10/2000 |
| JP | 2006-311730 | 11/2006 |
| JP | 2009-112181 | 5/2009 |
| JP | 2011-211860 | 10/2011 |

* cited by examiner

*Primary Examiner* — Hanh Nguyen
(74) *Attorney, Agent, or Firm* — Nixon & Vanderhye PC

(57) ABSTRACT

A rotor includes a rotor core having a plurality of pairs of magnet-receiving holes and a plurality of magnets respectively received in the magnet-receiving holes. Each pair of the magnet-receiving holes is arranged in a substantially V-shape that opens toward a stator side. The rotor core has, for each of the magnet-receiving holes, a magnetic flux barrier that is formed, at a magnetic pole centerline-side end of a stator-side wall surface of the magnet-receiving hole, so as to protrude from the stator-side wall surface toward the stator side. The protruding height H of the magnetic flux barrier from the stator-side wall surface is set to be in the following range: $0.12 \times R \leq H \leq 0.29 \times R$, where R is the minimum distance from an intersection P1, which is between the magnetic pole centerline and a rotor-side circumferential surface of the stator, to the stator-side wall surface of the magnet receiving hole.

5 Claims, 7 Drawing Sheets

(SECOND TYPE)

(THIRD TYPE)

(1ST TYTPE)

ROTOR FOR ROTATING ELECTRIC MACHINE

CROSS-REFERENCE TO RELATED APPLICATION

This application is based on and claims priority from Japanese Patent Application No. 2012-203242, filed on Sep. 14, 2012, the content of which is hereby incorporated by reference in its entirety into this application.

BACKGROUND

1. Technical Field

The present invention relates to rotors for rotating electric machines that are used in, for example, motor vehicles as electric motors and electric generators.

2. Description of Related Art

There are known IPM (Interior Permanent Magnet) motors that have permanent magnets embedded in a rotor core. The IPM motors can use both reluctance torque and magnetic toque, thereby achieving high efficiency. Therefore, the IPM motors are particularly suitable for use in hybrid and electric vehicles.

An IPM motor generally includes a stator and a rotor that is disposed in radial opposition to the stator. The rotor includes a rotor core and a plurality of permanent magnets. The rotor core has a plurality of pairs of magnet-receiving holes formed therein. Each pair of the magnet-receiving holes is arranged in a substantially V-shape that opens toward the stator side. Each of the permanent magnets is received in a corresponding one of the magnet-receiving holes of the rotor core. Further, for each pair of the magnet-receiving holes, the two corresponding permanent magnets which are respectively received in the two magnet-receiving holes of the pair are arranged so as to together form one magnetic pole of the rotor. In addition, for each pair of the magnet-receiving holes, there is formed a corresponding center bridge that extends in a radial direction of the rotor core between the two magnet-receiving holes of the pair to separate them from each other.

Japanese Unexamined Patent Application Publication No. 2000-278896 (to be simply referred to as Patent Document 1 hereinafter) discloses a technique of suitably designing magnetic flux barriers at opposite ends of each magnetic pole of the rotor, thereby reducing cogging torque of the motor.

However, with the technique disclosed in Patent Document 1, the q-axis inductance may be lowered and magnetic flux leakage via the corresponding center bridge may be increased.

Japanese Unexamined Patent Application Publication No. 2011-211860 (to be simply referred to as Patent Document 2 hereinafter) discloses a technique of providing magnetic flux barriers on the radially inside (i.e., the side closer to a longitudinal axis of the rotor core) of each magnetic pole of the rotor, thereby reducing magnetic flux leakage in a radially inward direction.

However, the technique disclosed in Patent Document 2 cannot be applied to rotors where there is insufficient space for providing the magnetic flux barriers in the vicinity of a radially inner periphery of the rotor core.

SUMMARY

According to an exemplary embodiment, a rotor for a rotating electric machine is provided which includes a rotor core and a plurality of magnets. The rotor core is configured to be disposed in radial opposition to a stator of the rotating electric machine. The rotor core has a plurality of pairs of magnet-receiving holes formed therein. Each pair of the magnet-receiving holes is arranged in a substantially V-shape that opens toward the stator side. The substantially V-shape has its two sides respectively extending in width directions of the two magnet-receiving holes of the pair. Each of magnets is received in a corresponding one of the magnet-receiving holes of the rotor core. For each pair of the magnet-receiving holes of the rotor core, the two corresponding magnets which are respectively received in the two magnet-receiving holes of the pair are arranged so as to together form one magnetic pole of the rotor. The magnetic pole has a centerline C1 that extends in a radial direction of the rotor core and bisects the magnetic pole in a circumferential direction of the rotor core. The rotor core further has, for each of the magnet-receiving holes, a magnetic flux barrier that is formed, at a centerline C1-side end of a stator-side wall surface of the magnet-receiving hole, so as to protrude from the stator-side wall surface toward the stator side. The stator-side wall surface extends in the width direction of the magnet-receiving hole. The protruding height H of the magnetic flux barrier from the stator-side wall surface of the magnet-receiving hole in a direction perpendicular to the stator-side wall surface is set to be in the following range: $0.12 \times R \leq H \leq 0.29 \times R$, where R is the minimum distance from an intersection P1, which is between the centerline C1 of the magnetic pole and a rotor-side circumferential surface of the stator, to the stator-side wall surface of the magnet receiving hole.

Consequently, with the upper limit of the protruding height H set to $0.29 \times R$, it is possible to suppress decrease in the q-axis inductance in the area of the rotor core on the stator side of each pair of the magnet-receiving holes. Moreover, with the lower limit of the protruding height H set to $0.12 \times R$, it is possible to enhance magnetic flux saturation occurring in the corresponding center bridge. Consequently, it is possible to reduce magnetic flux leakage via the corresponding center bridge, thereby increasing the amount of effective magnetic flux in the rotor.

Accordingly, with the above configuration of the rotor according to the embodiment, it is possible to increase the amount of effective magnetic flux without lowering the q-axis inductance in the area of the rotor core on the stator side of each pair of the magnet-receiving holes.

It is preferable that in the rotor, the following dimensional relationships are further satisfied: $0.12 \times D \leq W$; and $X \leq 0.1 \times D$. Here, D is the distance from an intersection P2 between an imaginary line L1 and the rotor-side circumferential surface of the stator to an intersection P3 between the imaginary line L1 and the centerline C1 of the magnetic pole; the imaginary line L1 is defined to extend along the stator-side wall surface of the magnet-receiving hole and tangent to an imaginary circle whose radius is equal to the minimum distance R and center is located at the intersection P1. W is the width of the magnetic flux barrier in the width direction of the magnet-receiving hole. X is an overlapping width over which the magnetic flux barrier and the corresponding magnet overlap each other in the direction perpendicular to the width direction of the magnet-receiving hole.

It is further preferable that a centerline C1-side end of the corresponding magnet is interposed between opposite ends of the magnetic flux barrier in the width direction of the magnet-receiving hole so that the overlapping width X is greater than 0.

Preferably, the rotor core further has, for each pair of the magnet-receiving holes, a corresponding center bridge that extends in the radial direction of the rotor core between the two magnet-receiving holes of the pair to separate them from each other. For each of the magnet-receiving holes, there is also formed a protrusion that protrudes from the corresponding center bridge inward of the magnet-receiving hole, so as to position the corresponding magnet in the magnet-receiving hole. The protrusion is radially offset from a radial center position of the corresponding center bridge toward the stator side.

In the rotor, each of the magnets may be implemented by a grain boundary diffusion magnet.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
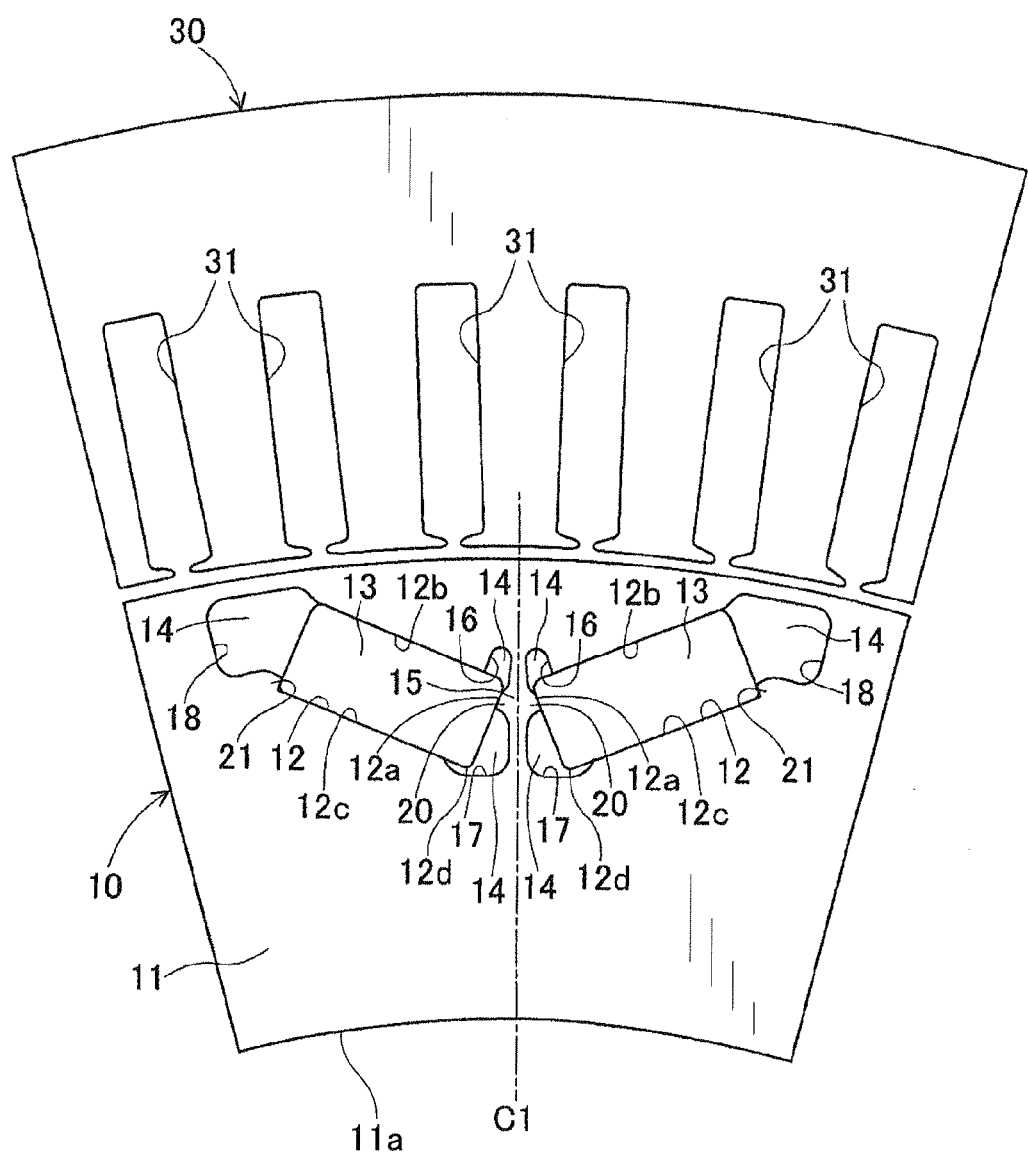
FIG. 1 is an axial view of a portion of a rotor according to an embodiment, the portion making up one magnetic pole of the rotor.

FIG. 1 shows the overall configuration of a rotor 10 according to an exemplary embodiment.

In the present embodiment, the rotor 10 is used in an electric motor for a motor vehicle. The motor includes, in addition to the rotor 10, a housing (not shown), a stator 30 and a rotating shaft (not shown). The housing receives both the rotor 10 and the stator 30 therein such that the rotor 10 is disposed radially inside of the stator 30 with a predetermined air gap formed between a radially outer periphery of the rotor 10 and a radially inner periphery of the stator 30. That is to say, the motor is of an inner rotor type. The rotating shaft is rotatably supported at opposite ends thereof by the housing via a pair of bearings (not shown). The rotor 10 is configured to be fixedly fitted on the rotating shaft so as to rotate along with the rotating shaft.

Figure 2:
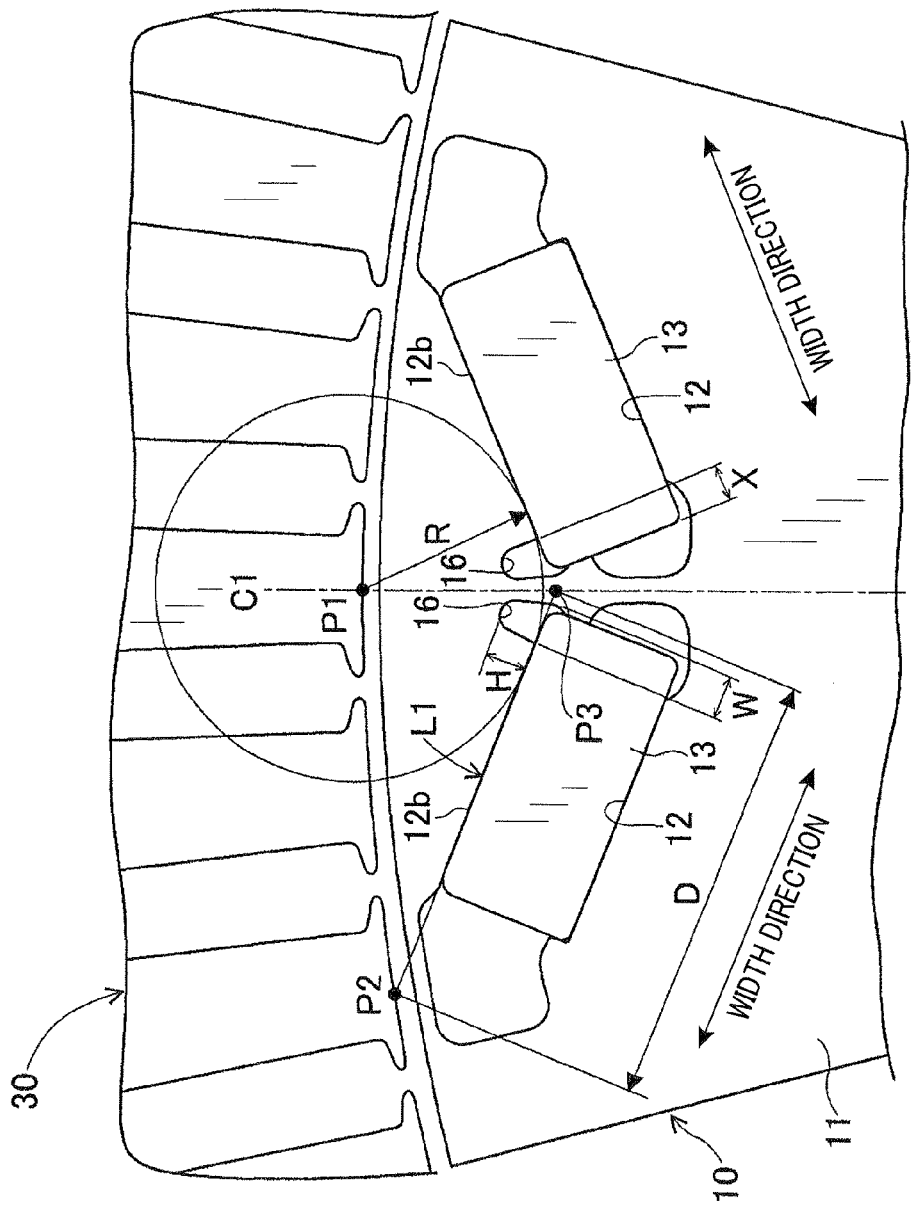
FIG. 2 is an enlarged view of part of FIG. 1.

As shown in FIGS. 1 and 2, the stator 30 has a plurality of slots 31 that are formed in a radially inner surface (or rotor-side circumferential surface) of a stator core and extends in an axial direction of the stator core so as to penetrate the stator core in the axial direction. The slots 31 are equally spaced in a circumferential direction of the stator core at predetermined intervals. The stator 30 also includes a three-phase stator coil (not shown) that is wound on the stator core so as to be received in the slots 31. In addition, in the present embodiment, the number of the slots 31 is set according to the number of magnetic poles of the rotor 10 to, for example, 72.

The rotor 10 includes a rotor core 11, a plurality of permanent magnets 13 embedded in the rotor core 11, and a filler 14 filled in void spaces formed between the rotor core 11 and the permanent magnets 13. That is to say, in the present embodiment, the rotor 10 is configured as an Interior Permanent Magnet (IPM) rotor.

The rotor core 11 is formed, by axially laminating a plurality of annular magnetic steel sheets, into a hollow cylindrical shape. Consequently, at the radial center of the rotor core 11, there is formed a through-hole 11a, in which the rotating shaft (not shown) is fixedly fitted so as to rotate together with the rotor core 11.

The permanent magnets 13 are embedded in the rotor core 11 so as to form the magnetic poles of the rotor 10 on the radially outer periphery of the rotor core 11. The magnetic poles are equally spaced in the circumferential direction of the rotor core 11 at predetermined intervals so that the polarities of the magnetic poles alternate between north and south in the circumferential direction. In addition, in the present embodiment, the number of the magnetic poles of the rotor 10 is equal to, for example, 12 (i.e., 6 north poles and 6 south poles).

More specifically, in the present embodiment, the rotor core 11 has a plurality (e.g., 12) of pairs of magnet-receiving holes 12 formed in the vicinity of the radially outer periphery of the rotor core 11. Each of the magnet-receiving holes 12 extends in the axial direction of the rotor core 11 so as to penetrate the rotor core 11 in the axial direction. Further, each of the magnet-receiving holes 12 has a cross section perpendicular to the axial direction of the rotor core 11, the shape of which is basically a rectangle.

In addition, it should be noted that though there is shown only one pair of the magnet-receiving holes 12 in FIGS. 1 and 2, the plurality of pairs of the magnet-receiving holes 12 are equally spaced in the circumferential direction of the rotor core 11 at predetermined intervals.

Moreover, in the present embodiment, each pair of the magnet-receiving holes 12 is arranged so as to form a substantially V-shape that opens toward the radially outer periphery of the rotor core 11 (or toward the stator 30 side). Further, for each pair of the magnet-receiving holes 12, there is formed a corresponding center bridge 15 of the rotor core 11 which extends in a radial direction of the rotor core 11 to separate the two magnet-receiving holes 12 of the pair from each other. The corresponding center bridge 15 is provided for causing magnetic flux saturation and thereby impeding formation of a magnetic circuit between the two magnet-receiving holes 12.

Furthermore, for each pair of the magnet-receiving holes 12, the two magnet-receiving holes 12 of the pair are symmetrically formed with respect to the corresponding center bridge 15; the width directions of the two magnet-receiving holes 12 respectively coincide with the extending directions of the two sides of the substantially V-shape formed by the two magnet-receiving holes 12. In addition, both the longitudinal directions of the two magnet-receiving holes 12 are parallel to the axial direction of the rotor core 11.

Each of the permanent magnets 13 is inserted in a corresponding one of the magnet-receiving holes 12 of the rotor core 11 so as to extend in the axial direction of the rotor core 11. Further, each of the permanent magnets 13 has a substantially rectangular cross section perpendicular to the axial direction of the rotor core 11. That is to say, in the present embodiment, each of the permanent magnets 13 has a substantially cuboid shape.

Moreover, for each pair of the magnet-receiving holes 12 of the rotor core 11, the two permanent magnets 13 which are respectively inserted in the two magnet-receiving holes 12 of the pair are arranged so that the polarities (north or south) of the two permanent magnets 13 are the same on the radially outer periphery of the rotor core 11. Consequently, the two permanent magnets 13 together form one of the magnetic poles of the rotor 10 on the radially outer periphery of the rotor core 11. In addition, as shown in FIGS. 1 and 2, when viewed along the axial direction of the rotor core 11, the two permanent magnets 13 are symmetrically arranged and extend obliquely with respect to a centerline C1 of the magnetic pole; the centerline C1 extends in the radial direction, along which the corresponding center bridge 15 of the rotor core 11 is formed, and bisects the magnetic pole in the circumferential direction of the rotor core 11. Consequently, the two permanent magnets 13 also together form a substantially V-shape that opens radially outward (or toward the radially outer periphery of the rotor core 11).

Furthermore, in the present embodiment, for each of the magnet-receiving holes 12 of the rotor core 11, there is formed a first protrusion 20 that protrudes from the corresponding center bridge 15 of the rotor core 11 inward of the magnet-receiving hole 12, so as to position the corresponding permanent magnet 13 in the circumferential direction of the rotor core 11 on the corresponding center bridge 15 side. Further, the first protrusion 20 is offset radially outward (or radially offset toward the stator 30 side) from a radial center position of the corresponding center bridge 15. In other words, the first protrusion 20 is positioned closer to the radially outer end than the radially inner end of the corresponding center bridge 15. Moreover, at the two corner portions of the magnet-receiving hole 12 respectively on opposite sides of the first protrusion 20, there are respectively formed first and second magnetic flux barriers 16 and 17. Consequently, a first wall surface 12a of the magnet-receiving hole 12, which extends perpendicular to the width direction of the magnet-receiving hole 12 on the centerline C1 side, is formed only at a distal end of the first protrusion 20.

The first magnetic flux barrier 16 is formed at the corner portion between the first wall surface 12a and a second wall surface 12b of the magnet-receiving hole 12; the second wall surface 12b extends in the width direction of the magnet-receiving hole 12 on the radially outer side. In other words, the first magnetic flux barrier 16 is formed at the centerline C1-side end of the radially outermost wall surface (or the stator 30-side wall surface) 12b of the magnet-receiving hole 12 so as to protrude from the wall surface 12b toward the stator 30 side (or radially outward). In addition, the first magnetic flux barrier 16 has, for example, a substantially horn shape.

Further, in the present embodiment, referring to FIG. 2, the protruding height H of the first magnetic flux barrier 16 from the second wall surface 12b in the direction perpendicular to the second wall surface 12b is set to be in the following range:

$$0.12 \times R \leq H \leq 0.29 \times R,$$

where R is the minimum distance from an intersection P1 between the centerline C1 of the magnetic pole and the radially inner surface (or rotor-side circumferential surface) of the stator 30 to the second wall surface 12b of the magnet-receiving hole 12. In addition, the minimum distance R is represented by the length of a straight line segment which extends perpendicular to the second wall surface 12b of the magnet-receiving hole 12 from the intersection P1 to the second wall surface 12b.

Setting the upper limit of the protruding height H to 0.29× R, it is possible to suppress decrease in the q-axis inductance in the area of the rotor core 11 on the radially outside of each pair of the magnet-receiving holes 12. Moreover, setting the lower limit of the protruding height H to 0.12×R, it is possible to enhance magnetic flux saturation occurring in the corresponding center bridge 15. Consequently, it is possible to reduce magnetic flux leakage via the corresponding center bridge 15, thereby increasing the amount of effective magnetic flux in the rotor 10.

In addition, for each pair of the magnet-receiving holes 12, the d-axis extends along the corresponding center bridge 15, while the q-axis extends along the sides of the V-shape formed by the pair of the magnet-receiving holes 12.

Furthermore, in the present embodiment, referring to FIG. 2, the following dimensional relationships are further satisfied:

$$0.12 \times D \leq W; \text{ and}$$

$$X \leq 0.1 \times D,$$

where D is the distance from an intersection P2 between an imaginary line L1 and the radially inner surface of the stator 30 to an intersection P3 between the imaginary line L1 and the centerline C1 of the magnetic pole, the imaginary line L1 being defined to extend along the second wall surface 12b of the magnet-receiving hole 12 and tangent to an imaginary circle whose radius is equal to the minimum distance R and center is located at the intersection P1, W is the width of the first magnetic flux barrier 16 in the width direction of the magnet-receiving hole 12, and X is the overlapping width over which the first magnetic flux barrier 16 and the corresponding permanent magnet 13 overlap each other in the direction perpendicular to the width direction of the magnet-receiving hole 12.

In addition, in the present embodiment, about 95% of the width W of the first magnetic flux barrier 16 overlaps the corresponding permanent magnet 13 in the direction perpendicular to the width direction of the magnet-receiving hole 12. Further, as described above, the overlapping width X is specified to be less than or equal to 0.1×D. Consequently, the width W of the first magnetic flux barrier 16 is set to be in such an optimal range as to increase the amount of effective magnetic flux and thus the torque of the motor.

Referring back to FIG. 1, the second magnetic flux barrier 17 is formed at the corner portion 12d (to be referred to as the radially innermost corner portion 12d hereinafter) between the first wall surface 12a and a third wall surface 12c of the magnet-receiving hole 12; the third wall surface 12c extends in the width direction of the magnet-receiving hole 12 on the radially inner side. The second magnetic flux barrier 17 is defined by a curved surface that includes three or more single-curvature surfaces having different curvatures. Moreover, among the single-curvature surfaces, the single-curvature surface which has the minimum curvature is positioned closest to a longitudinal centerline (not shown) of the hollow cylindrical rotor core 11. Therefore, it is easiest for centrifugal stress (i.e., stress induced by centrifugal force) to concentrate on the single-curvature surface having the minimum curvature. However, the single-curvature surface having the minimum curvature is arranged away from the corresponding center bridge 15 on which it is also easy for centrifugal stress to concentrate. Consequently, with the above arrangement, it is possible to distribute stress concentration in the rotor core 11.

In the present embodiment, the first protrusion 20, which would be provided at the radially innermost corner portion 12d of the magnet-receiving hole 12 according to the prior art, is offset radially outward from the radial center position of the corresponding center bridge 15. Consequently, the influence of the first protrusion 20 on generation of centrifugal stress in the corresponding center bridge 15 is reduced, thereby preventing excessive stress concentration from occurring in the corresponding center bridge 15.

Moreover, as shown in FIG. 1, at the end of the third wall surface 12c of the magnet-receiving hole 12 on the opposite side to the corresponding center bridge 15, there is formed a second protrusion 21 for positioning the corresponding permanent magnet 13 in the circumferential direction of the rotor core 11 on the opposite side to the corresponding center bridge 15. Further, on the radially outside (or the stator 30 side) of the second protrusion 21, there is formed a third magnetic flux barrier 18 in a predetermined shape.

Furthermore, the filler 14 is filled in all of the gaps between the wall surfaces of the magnet-receiving hole 12 and the corresponding permanent magnet 13 and the first to the third magnetic flux barriers 16-18, thereby fixing the corresponding permanent magnet 13 in the magnet-receiving hole 12. That is, the first to the third magnetic flux barriers 16-18 are filled with the filler 14. In addition, the filler 14 is made of a nonmagnetic material, such as epoxy resin.

After having described the configuration of the rotor 10 according to the present embodiment, advantages thereof will be described hereinafter.

In the present embodiment, the rotor 10 includes the hollow cylindrical rotor core 11 and the permanent magnets 13. The rotor core 11 is disposed in radial opposition to the stator 30 and has the plurality of pairs of magnet-receiving holes 12 formed therein. Each pair of the magnet-receiving holes 12 are arranged in the substantially V-shape that opens radially outward (or toward the stator 30 side); the substantially V-shape has its two sides respectively extending in the width directions of the two magnet-receiving holes 12 of the pair. Each of the permanent magnets 13 is received in the corresponding one of the magnet-receiving holes 12 of the rotor core 11. For each pair of the magnet-receiving holes 12 of the rotor core 11, the two corresponding permanent magnets 13 which are respectively received in the two magnet-receiving holes 12 of the pair are arranged so as to together form one magnetic pole of the rotor 10. The magnetic pole has the centerline C1 that extends in the radial direction of the rotor core 11 and bisects the magnetic pole in the circumferential direction of the rotor core 11. The rotor core 11 further has, for each of the magnet-receiving holes 12, the first magnetic flux barrier 16 that is formed, at the centerline C1-side end of the second wall surface (or the stator-side wall surface) 12b of the magnet-receiving hole 12, so as to protrude from the second wall surface 12b toward the stator 30 side. The second wall surface 12b extends in the width direction of the magnet-receiving hole 12. The protruding height H of the first magnetic flux barrier 16 from the second wall surface 12b in the direction perpendicular to the second wall surface 12b is set to be in the following range: $0.12 \times R \leq H \leq 0.29 \times R$.

Consequently, with the upper limit of the protruding height H set to $0.29 \times R$, it is possible to suppress decrease in the q-axis inductance in the area of the rotor core 11 on the radially outside (or on the stator 30 side) of each pair of the magnet-receiving holes 12. Moreover, with the lower limit of the protruding height H set to $0.12 \times R$, it is possible to enhance magnetic flux saturation occurring in the corresponding center bridge 15. Consequently, it is possible to reduce magnetic flux leakage via the corresponding center bridge 15, thereby increasing the amount of effective magnetic flux in the rotor 10.

Accordingly, with the above configuration of the rotor 10 according to the present embodiment, it is possible to increase the amount of effective magnetic flux in the rotor 10 without lowering the q-axis inductance in the area of the rotor core 11 on the radially outside of each pair of the magnet-receiving holes 12.

Moreover, in the present embodiment, the following dimensional relationships are further satisfied: $0.12 \times D \leq W$; and $X \leq 0.1 \times D$.

Satisfying the above dimensional relationships, it is possible to set the width W of the first magnetic flux barrier 16 in such an optimal range as to increase the amount of effective magnetic flux and thus the torque of the motor.

Furthermore, in the present embodiment, for each of the magnet-receiving holes 12, there is formed the first protrusion 20 that protrudes from the corresponding center bridge 15 inward of the magnet-receiving hole 12, so as to position the corresponding permanent magnet 13 in the magnet-receiving hole 12. The first protrusion 20 is radially offset from the radial center position of the corresponding center bridge 15 toward the stator 30 side.

With the above configuration, the influence of the first protrusion 20 on generation of centrifugal stress in the corresponding center bridge 15 is reduced, thereby preventing excessive stress concentration from occurring in the corresponding center bridge 15.

Experiment 1

This experiment has been conducted to determine the optimal range of the protruding height H of the first magnetic flux barrier 16 in the rotor 10 according to the previous embodiment.

Specifically, in the experiment, a plurality of sample rotors were prepared, all of which had the same configuration as the rotor 10 according to the previous embodiment. However, for those sample rotors, the dimensional ratio H/R was varied in the range of 0 to 0.5. Here, R is the minimum distance from the intersection P1 to the second wall surface 12b of the magnet-receiving hole 12 (see FIG. 2). Then, each of the sample rotors was tested to measure the q-axis inductance, the amount of effective magnetic flux and the torque of the motor.

Figure 3:
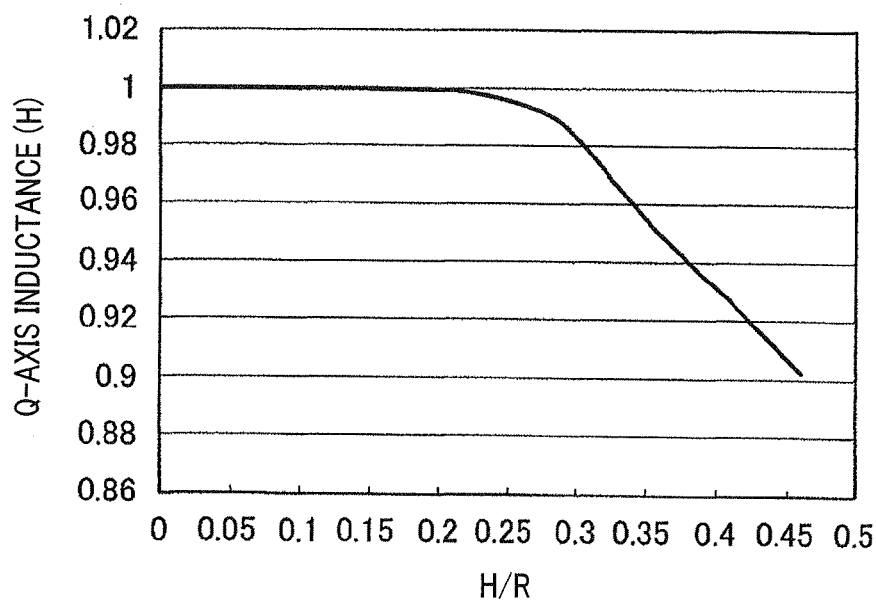
FIG. 3 is a graphical representation showing the relationship between the q-axis inductance and a dimensional ratio H/R in the rotor, the relationship having been determined by Experiment 1.
Figure 4:
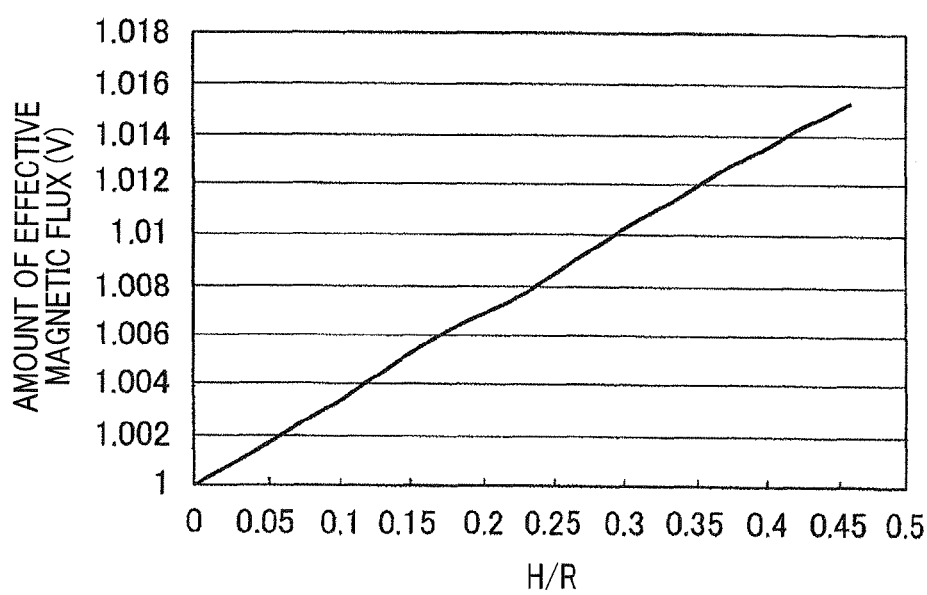
FIG. 4 is a graphical representation showing the relationship between the amount of effective magnetic flux and the dimensional ratio H/R in the rotor, the relationship having been determined by Experiment 1.
Figure 5:
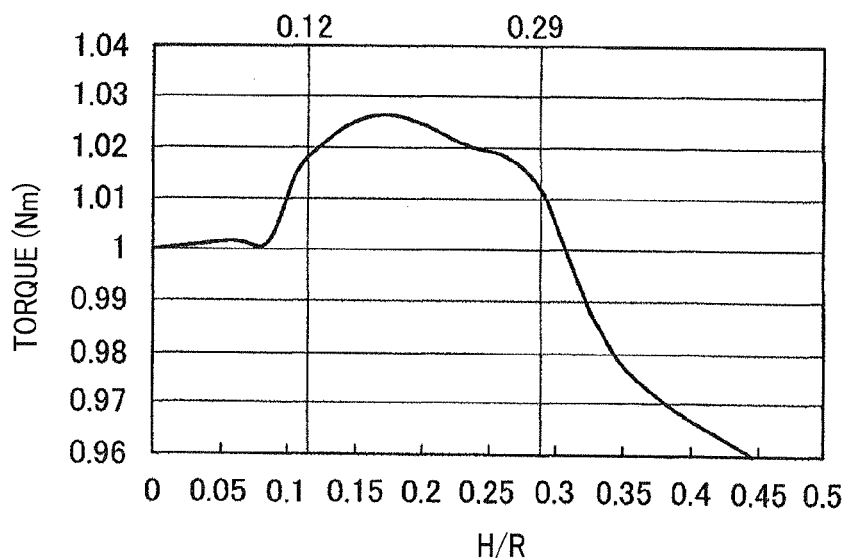
FIG. 5 is a graphical representation showing the relationship between torque and the dimensional ratio H/R in the rotor, the relationship having been determined by Experiment 1.

FIG. 3 shows the change in the measured q-axis inductance with the dimensional ratio H/R. FIG. 4 shows the change in the measured amount of effective magnetic flux with the dimensional ratio H/R. FIG. 5 shows the change in the measured torque of the motor with the dimensional ratio H/R.

In addition, in this and next experiments, the amount of effective magnetic flux was measured by measuring the back electromotive force induced in the stator 30. Therefore, the amount of effective magnetic flux is shown in the unit of "V" instead of "Wb" in FIG. 4 and FIG. 9 to be described later.

As shown in FIG. 3, the q-axis inductance rapidly dropped when the dimensional ratio H/R had increased to exceed 0.29.

Moreover, as shown in FIG. 4, the amount of effective magnetic flux linearly increased in proportion to the dimensional ratio H/R. Furthermore, as shown in FIG. 5, the torque of the motor was higher than or equal to 1.01 when the dimensional ratio H/R was in the range of 0.12 to 0.29.

Accordingly, from the test results shown in FIGS. 3-5, it has been made clear that the optimal range of the protruding height H is from 0.12×R to 0.29×R.

Experiment 2

This experiment has been conducted to determine the optimal ranges of the width W of the first magnetic flux barrier 16 and the overlapping width X in the rotor 10 according to the previous embodiment.

Figure 6:
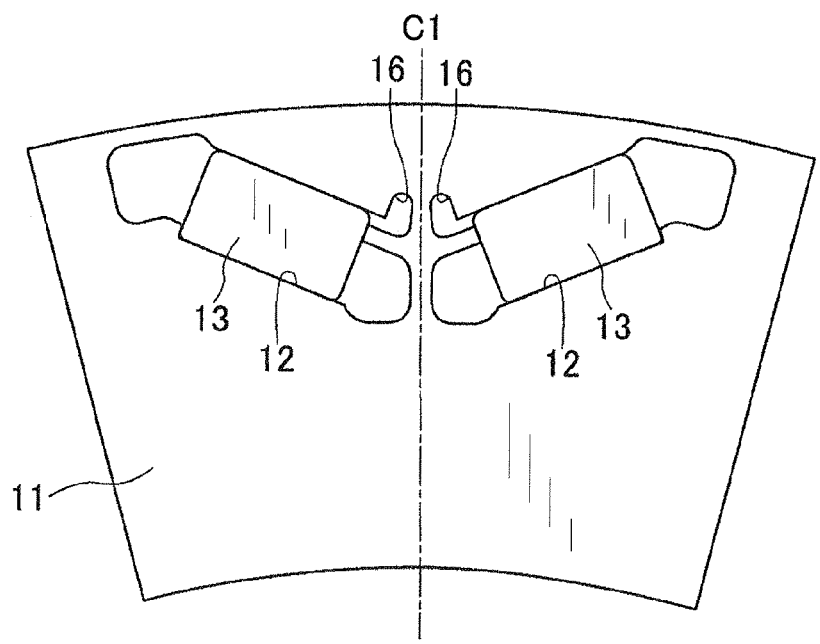
FIG. 6 is an axial view of a portion of a second-type sample rotor tested in Experiment 2, the portion making up one magnetic pole of the second-type sample rotor.
Figure 7:
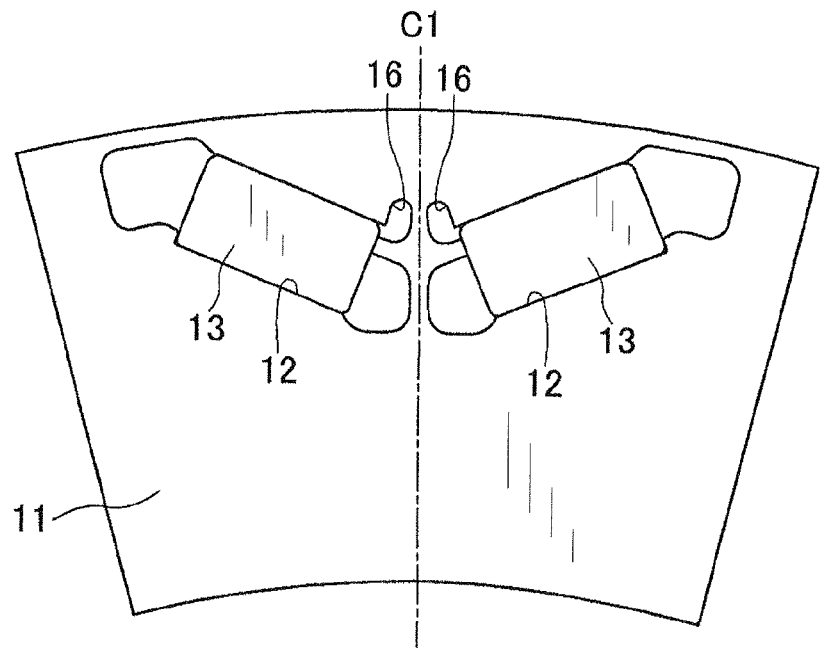
FIG. 7 is an axial view of a portion of a third-type sample rotor tested in Experiment 2, the portion making up one magnetic pole of the third-type sample rotor.

Specifically, in the experiment, three different types of sample rotors were prepared. The first-type sample rotors had the same configuration as the rotor 10 according to the previous embodiment. The second-type sample rotors have a configuration as shown in FIG. 6, in which the first magnetic flux barrier 16 is formed away from the corresponding permanent magnet 13 toward the centerline C1 side. The third-type sample rotors have a configuration as shown in FIG. 7, in which the first magnetic flux barrier 16 is formed so as to adjoin the centerline C1-side end surface of the corresponding permanent magnet 13.

First, the first-type, second-type and third-type sample rotors, for which the dimensional ratio W/D was varied in the range of 0 to 0.25, were tested to measure the torque of the motor. Here, D is the distance from the intersection P2 to the intersection P3 (see FIG. 2).

Figure 8:
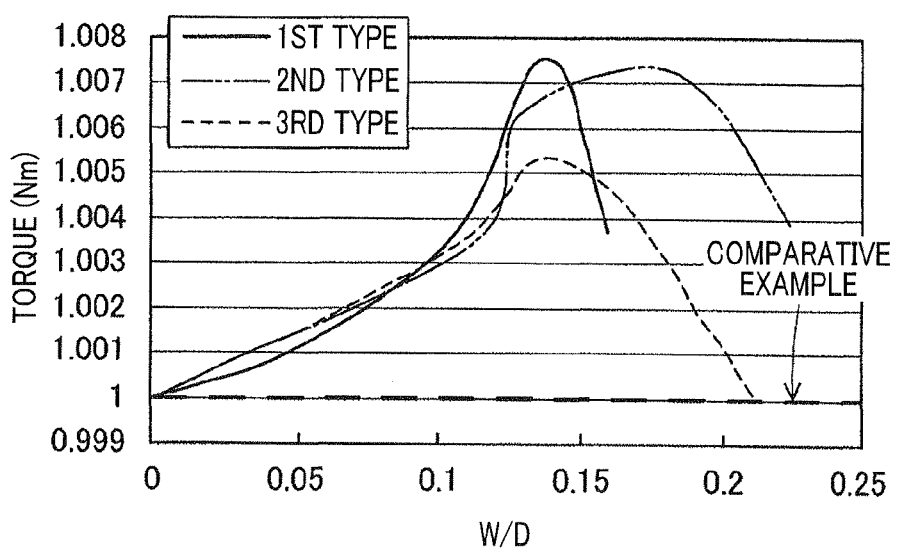
FIG. 8 is a graphical representation showing the changes in torque with a dimensional ratio W/D in the first-type, second-type and third-type sample rotors, the changes having been determined by Experiment 2.

FIG. 8 shows the change in the measured torque of the motor with the dimensional ratio W/D for each of the first, second and third rotor types. In addition, a comparative sample rotor, which had no first magnetic flux barrier 16 formed therein, was also tested in the experiment. The measured torques for the first to the third types of sample rotors are shown in FIG. 8 as relative values to the measured torque for the comparative sample torque (designated by "Comparative Example" in FIG. 8).

As seen from FIG. 8, for each of the first to the third rotor types, with increase in the dimensional ratio W/D, the measured torque first gradually increased and then rapidly increased from when the dimensional ratio W/D had increased to exceed 0.12, until the measured torque reaches a peak value thereof.

Accordingly, from the test results shown in FIG. 8, it has been made clear that to secure high torque of the motor, the dimensional ratio W/D is preferably set to be greater than or equal to 0.12. In other words, it is preferable that 0.12×D≤W. In addition, the upper limit for the width W of the first magnetic barrier 16 is 1×D.

Next, the first-type, second-type and third-type sample rotors, for which the dimensional ratio X/D was varied in the range of 0 to 0.14 by varying the width D of the first magnetic flux barrier 16, were tested to measure the amount of effective magnetic flux.

In addition, in varying the dimensional ratio X/D, the protruding height H of the first magnetic flux barrier 16 was kept constant at the lower limit 0.12×R, so as to make the influence of the protruding height H on the amount of effective magnetic flux equal for all the sample rotors. Moreover, for the first-type and third-type sample rotors, with increase in the width W of the first magnetic flux barrier 16, the overlapping width X was also increased by the same amount as the width W. In comparison, for the second-type sample rotors, with increase in the width W of the first magnetic flux barrier 16, the overlapping width X was first kept zero and then increased by the same amount as the width W from when the width W had increased to interpose the centerline C1-side end surface of the corresponding permanent magnet 13 between opposite ends of the first magnetic flux barrier 16 in the width direction of the magnet-receiving hole 12.

Figure 9:
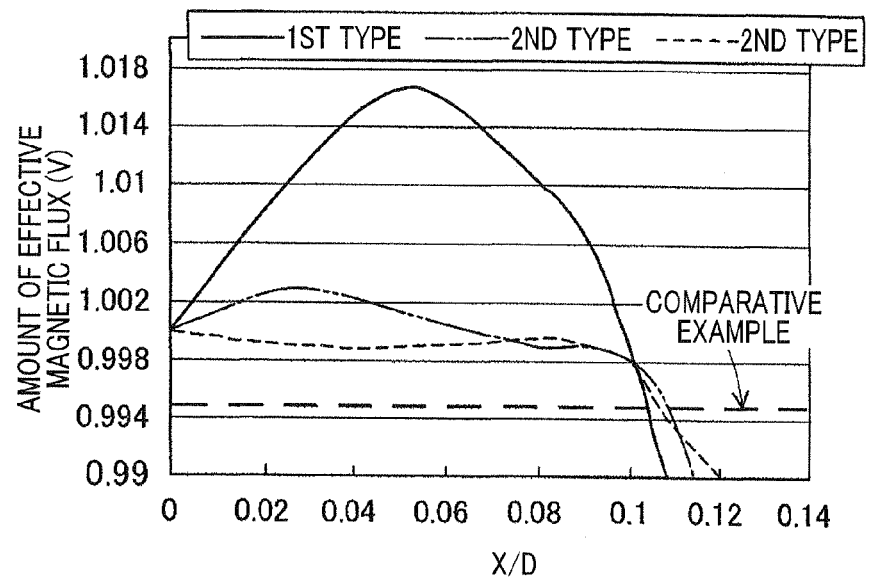
FIG. 9 is a graphical representation showing the changes in the amount of effective magnetic flux with a dimensional ratio X/D in the first-type, second-type and third-type sample rotors, the changes having been determined by Experiment 2.

FIG. 9 shows the change in the measured amount of effective magnetic flux with the dimensional ratio X/D for each of the first, second and third rotor types. In addition, the measured amount of effective magnetic flux for the comparative sample rotor is also designated by "Comparative Example" in FIG. 9.

As seen from FIG. 9, for each of the first to the third rotor types, when the dimensional ratio X/D was in the range of 0 to 0.1, the measured amount of effective magnetic flux was considerably higher than that for the comparative sample rotor.

In particular, for the first rotor type (i.e., the type of the rotor 10 according to the previous embodiment), when the dimensional ratio X/D was in the range of 0 to 0.1, the measured amount of effective magnetic flux was remarkably higher than that for the comparative sample rotor. However, when the dimensional ratio X/D had increased to exceed 0.1, the measured amount of effective magnetic flux began to drop rapidly.

Figure 10:
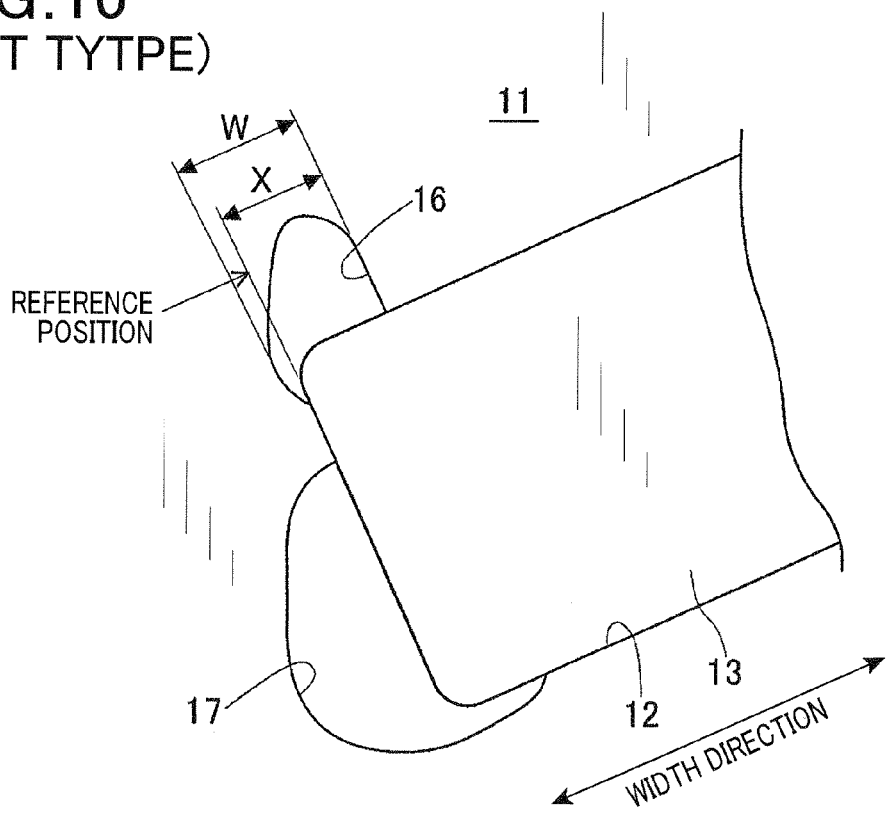
FIG. 10 is a schematic view illustrating dimensional parameters W and X in a first-type sample rotor tested in Experiment 2.

In addition, as shown in FIG. 10, in the first-type sample rotors, the reference position of the overlapping width X (i.e., the centerline C1-side end of the corresponding permanent magnet 13) was always kept between opposite ends of the first magnetic flux barrier 16 in the width direction of the magnet-receiving hole 12. In other words, the overlapping width X was always kept greater than zero (i.e., X>0).

Accordingly, from the test results shown in FIG. 9, it has been made clear that to increase the amount of effective magnetic flux, the dimensional ratio X/D is preferably set to be less than or equal to 0.1. In other words, it is preferable that X≤0.1×D. In addition, the lower limit for the overlapping width X is 0×D (i.e., zero).

While the above particular embodiment has been shown and described, it will be understood by those skilled in the art that various modifications, changes, and improvements may be made without departing from the spirit of the invention.

Figure 11:
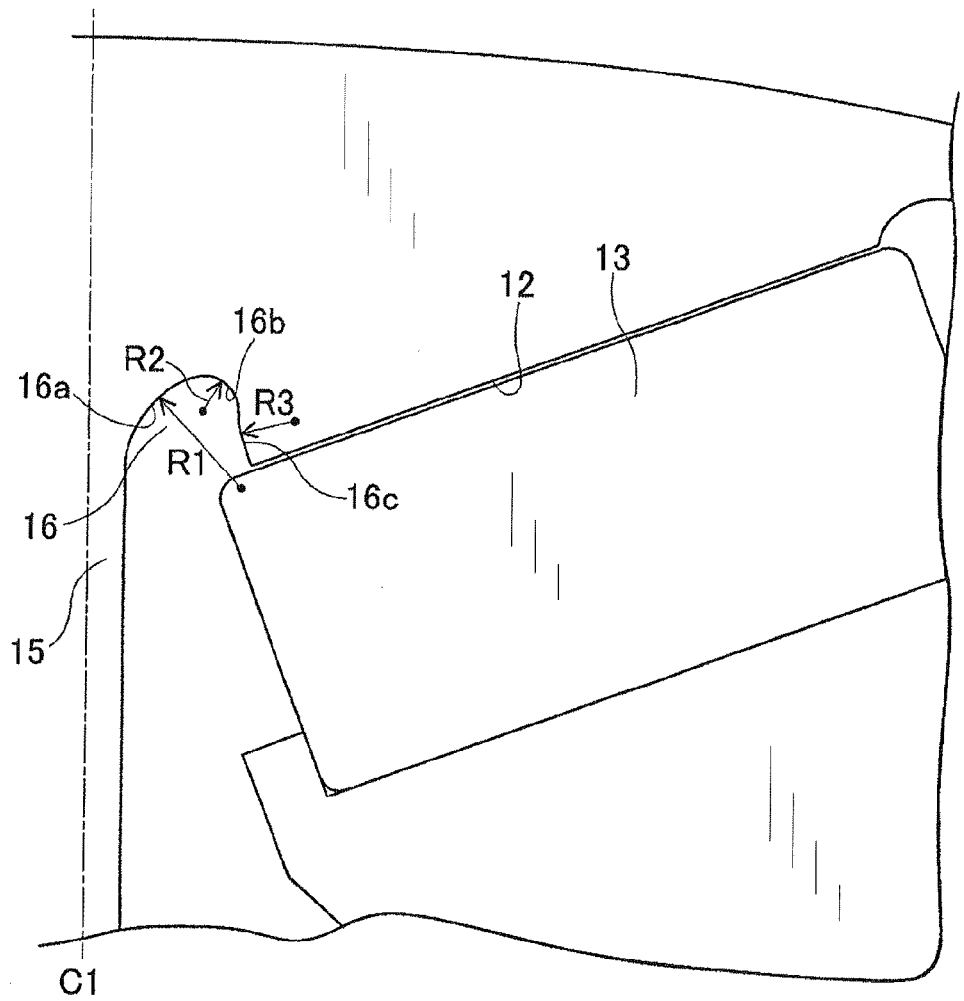
FIG. 11 is a schematic view illustrating a variation of the rotor according to the embodiment.

For example, as shown in FIG. 11, it is possible to modify the shape of the first magnetic flux barrier 16 so as to increase the radius of curvature R1 of a single-curvature surface 16a that adjoins the corresponding center bridge 15, thereby reducing centrifugal stress induced in the corresponding center bridge 15. Moreover, it is also possible to modify the shape of the first magnetic flux barrier 16 so as to include a single-curvature surface 12b that adjoins the single-curvature surface 12a and a single-curvature surface 12c that adjoins the single-curvature surface 12b from the opposite side to the single-curvature surface 12a. The second and third single-curvature surfaces 12b and 12c are respectively convex toward opposite directions. Consequently, it is possible to set the width W of the first magnetic flux barrier 16 and the overlapping width X to desired values by suitably setting the centers and the radii of curvature R2 and R3 of the single-curvature surfaces 12b and 12c.

In the previous embodiment, the rotor 10 has the permanent magnets 13 respectively received in the corresponding magnet-receiving holes 12 of the rotor core 11.

However, the rotor 10 may also have, instead of the permanent magnets 13, a plurality of grain boundary diffusion magnets respectively received in the corresponding magnet-receiving holes 12 of the rotor core 11. The grain boundary diffusion magnets have their coercivity enhanced only at the outer surfaces thereof by using, for example, terbium (Tb). Therefore, in each of the grain boundary diffusion magnets, the coercivity is distributed so as to increase from the center to the outer surface of the magnet. Consequently, even when the width W and thus the magnetic reluctance of the first magnetic flux barrier 16 are increased, it is still possible to keep high magnetic force of the magnet. That is to say, employing the grain boundary diffusion magnets instead of the permanent magnets 13, it is possible to increase the width W of the first magnetic flux barrier 16. Moreover, since the grain boundary diffusion magnets allow a low permeance modulus at the outer surfaces thereof, it is possible to increase the application range of the horn-shaped first magnetic flux barrier 16. Furthermore, compared to the permanent magnets 13, it is possible to more reliably prevent the grain boundary diffusion magnets from being demagnetized by the provision of the first magnetic flux barriers 16 in the rotor core 11.

In the previous embodiment, the invention is directed to the rotor 10 for the inner rotor-type motor. However, the invention can also be applied to a rotor for an outer rotor-type rotating electric machine in which the rotor is disposed radially outside of a stator of the machine.

Moreover, in the previous embodiment, the invention is directed to the rotor 10 for a vehicular motor. However, the invention can also be applied to a rotor for an electric generator or a rotor for a motor generator that can selectively function either as an electric motor or as an electric generator.

What is claimed is:

1. A rotor for a rotating electric machine, the rotor comprising:
    a rotor core configured to be disposed in radial opposition to a stator of the rotating electric machine, the rotor core having a plurality of pairs of magnet-receiving holes formed therein, each pair of the magnet-receiving holes being arranged in a substantially V-shape that opens toward the stator side, the substantially V-shape having its two sides respectively extending in width directions of the two magnet-receiving holes of the pair; and
    a plurality of magnets each of which is received in a corresponding one of the magnet-receiving holes of the rotor core,
    wherein
    for each pair of the magnet-receiving holes of the rotor core, the two corresponding magnets which are respectively received in the two magnet-receiving holes of the pair are arranged so as to together form one magnetic pole of the rotor, the magnetic pole having a centerline C1 that extends in a radial direction of the rotor core and bisects the magnetic pole in a circumferential direction of the rotor core,
    the rotor core further has, for each of the magnet-receiving holes, a magnetic flux barrier that is formed, at a centerline C1-side end of a stator-side wall surface of the magnet-receiving hole, so as to protrude from the stator-side wall surface toward the stator side, the stator-side wall surface extending in the width direction of the magnet-receiving hole, and
    a protruding height H of the magnetic flux barrier from the stator-side wall surface of the magnet-receiving hole in a direction perpendicular to the stator-side wall surface is set to be in the following range:

$0.12 \times R \leq H \leq 0.29 \times R$, where R is a minimum distance from an intersection P1, which is between the centerline C1 of the magnetic pole and a rotor-side circumferential surface of the stator, to the stator-side wall surface of the magnet receiving hole.

2. The rotor as set forth in claim 1, wherein the following dimensional relationships are further satisfied:

$0.12 \times D \leq W$; and $X \leq 0.1 \times D$, where D is a distance from an intersection P2 between an imaginary line L1 and the rotor-side circumferential surface of the stator to an intersection P3 between the imaginary line L1 and the centerline C1 of the magnetic pole, the imaginary line L1 being defined to extend along the stator-side wall surface of the magnet-receiving hole and tangent to an imaginary circle whose radius is equal to the minimum distance R and center is located at the intersection P1,
    W is a width of the magnetic flux barrier in the width direction of the magnet-receiving hole, and
    X is an overlapping width over which the magnetic flux barrier and the corresponding magnet overlap each other in the direction perpendicular to the width direction of the magnet-receiving hole.

3. The rotor as set forth in claim 2, wherein a centerline C1-side end of the corresponding magnet is interposed between opposite ends of the magnetic flux barrier in the width direction of the magnet-receiving hole so that the overlapping width X is greater than 0.

4. The rotor as set forth in claim 1, wherein the rotor core further has, for each pair of the magnet-receiving holes, a corresponding center bridge that extends in the radial direction of the rotor core between the two magnet-receiving holes of the pair to separate them from each other,
    for each of the magnet-receiving holes, there is also formed a protrusion that protrudes from the corresponding center bridge inward of the magnet-receiving hole, so as to position the corresponding magnet in the magnet-receiving hole, and
    the protrusion is radially offset from a radial center position of the corresponding center bridge toward the stator side.

5. The rotor as set forth in claim 1, wherein each of the magnets is a grain boundary diffusion magnet.

* * * * *